United States Patent [19]

Yonai et al.

[11] 3,949,411

[45] Apr. 6, 1976

[54] EXPOSURE APPARATUS

[75] Inventors: Fumiaki Yonai; Masaaki Yamauchi; Takashi Fujimura, all of Mobara; Akira Kotoyori, Ichimiya, all of Japan

[73] Assignee: Hitachi, Ltd., Tokyo, Japan

[22] Filed: Feb. 4, 1974

[21] Appl. No.: 439,215

[30] Foreign Application Priority Data

Feb. 9, 1973 Japan ............................... 48-15637

[52] U.S. Cl. ................................................... 354/1
[51] Int. Cl.² ......................................... G03B 41/00
[58] Field of Search ......................... 354/1; 313/92 B

[56] References Cited

UNITED STATES PATENTS

| | | | |
|---|---|---|---|
| 3,559,546 | 2/1971 | McKee | 354/1 |
| 3,663,854 | 5/1972 | Tsunesa et al. | 313/92 B X |
| 3,725,106 | 4/1973 | Hosokoshi | 95/1 RS |
| 3,738,234 | 6/1973 | Borden | 354/1 |

*Primary Examiner*—Richard M. Sheer
*Attorney, Agent, or Firm*—Charles E. Pfund

[57] ABSTRACT

In exposure apparatus adapted to expose the phosphor on the face plate of a colour picture tube provided with a slot type colour selection electrode of the type comprising an exposure light source and a correction lens disposed between the light source and the colour selection electrode the exposure light source and the correction lens are moved with respect to the colour selection electrode.

7 Claims, 9 Drawing Figures

EXPOSURE APPARATUS

BACKGROUND OF THE INVENTION

This invention relates to a colour picture tube provided with a slot type colour selection electrode. More particularly, it relates to an exposure apparatus for exposing to light phosphor films of a colour picture tube having a fluorescent screen composed of stripe-shaped phosphors or films of non-luminous substance coated between stripe-shaped phosphors of the so-called black matrix type colour picture tube.

There are many types of colour selection electrodes for use in colour picture tubes such as dot type, stripe type and slot type. In a colour picture tube incorporated with a slot type colour selection electrode it is not sufficient to form the phosphor to have dimensions and configurations which correspond to the slots formed in the effective area of the colour selection electrode. More particularly, when considering the landing error of the electron beams transmitting through respective slots it is necessary to form the phosphor in the form of continuous stripes extending in the longitudinal direction of the slots. To form such phosphor it has been proposed to use exposure apparatus provided with a plurality of collimeters which are juxtaposed in the direction of the slots or a collimeter provided with an elongated light source. With these exposure apparatus, however, an image of a mercury arc lamp or of the collimeter itself tends to appear in the exposure light so that it is difficult to obtain a desired brightness distribution on the inner surface of the panel on which the fluorescent screen is to be formed. Especially, in the latter type exposure apparatus, since there is a limit on the length of the linear light source it is impossible to perform satisfactory exposure. Such difficulty is especially remarkable in the so-called black matrix type colour picture tube wherein the deviation in the brightness determines most of the white uniformity.

SUMMARY OF THE INVENTION

Accordingly, it is an object of this invention to provide an improved exposure apparatus capable of eliminating the deviation in the brightness when exposing to light stripe shaped phosphors or films of non-luminous substance applied between the stripe shaped phosphors.

Another object of this invention is to provide an improved exposure apparatus capable of producing exposure light of substantially uniform brightness by utilizing an essentially point light source.

Still another object of this invention is to provide new and improved exposure apparatus capable of preventing decrease in the effect of a correction lens caused by the variation in the direction of refraction due to the movement of the exposure light source.

According to this invention these and other object can be accomplished by providing exposure apparatus adapted to expose to light the phosphor on the face plate of a colour picture tube provided with a slot type colour selection electrode of the type comprising an exposure light source and a correction lens disposed between the light source and the colour selection electrode, characterized in that the exposure light source is mounted on a carriage movable with respect to the colour selection electrode and that the carriage is moved by driving means at a substantially constant speed.

This arrangement can eliminate the images of the collimeter and a linear light source thus assuring uniform exposure of the phosphor.

According to one modification the correction lens is reciprocated in synchronism with the carriage. In another modification, the light source is mounted on a rotary disc mounted on the movable carriage.

BRIEF DESCRIPTION OF THE DRAWINGS

Further objects and advantages of the invention can be more fully understood from the following detailed description taken in conjunction with the accompanying drawings in which:

FIG. 2 shows graphs useful to explain the relationship between an exposure light source and a colour selection electrode wherein

DESCRIPTION OF THE PREFERRED EMBODIMENTS

Figure 1:
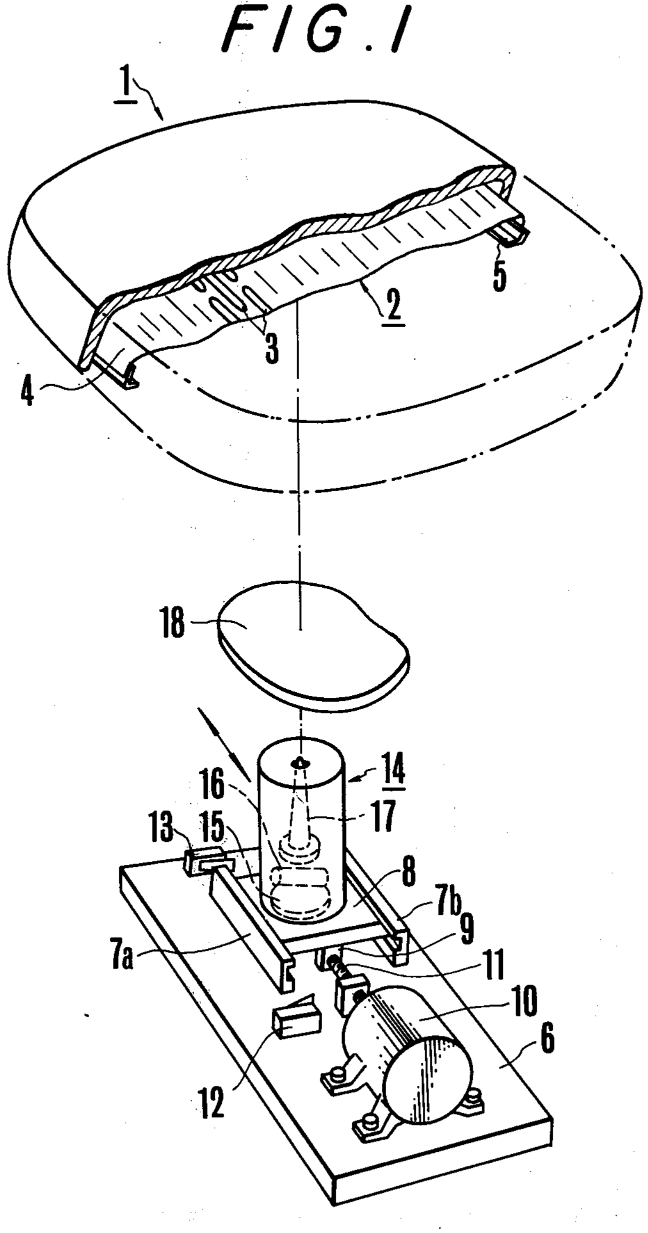
FIG. 1 is a perspective view showing one example of the exposure apparatus embodying the invention.

Referring to FIG. 1, the panel 1 of a colour picture tube provided with a slot type colour selection electrode 2 is supported on a suitable support, not shown. The colour selection electrode 2 comprises a mask 4 provided with a plurality of parallel slots 3 (some of them are shown exaggerated) and a frame 5 for supporting and reinforcing the mask 4. Beneath the colour selection electrode 2 is positioned a base 6 on which are positioned a pair of guide members 7*a* and 7*b* extending in parallel with slots 3 for slidably supporting a movable carriage 8. A nut 9 is secured to the lower surface of the carriage 8 for receiving a feed screw 11 driven by a reversible motor 10 mounted on the base 6. The reversible motor 10 adapted to move the carriage 8 at a substantially constant speed is controlled to rotate in the forward or reverse direction by means of a pair of microswitches 12 and 13 positioned on the base 6 at the limits of the stroke of the carriage.

A light source unit 14 is mounted on the carriage 8 for directing exposure light toward and panel 1 of the colour picture tube. The light source unit 14 contains a reflective mirror 15, a mercury arc lamp 16 and a collimeter 17 and the light emitting from one end of the collimeter 17 is corrected or compensated for by a correction lens 18 positioned between the collimeter and the panel. The light corrected by the correction lens 18 is projected upon the mask 1. Although, in the arrangement shown in FIG. 1 the light source unit 14 is constructed to be movable substantially in parallel with the slots 3, it will be clear that any arrangement can be used that can provide relative movement between the light source unit and the panel 1 of the colour picture tube.

Figure 2A:
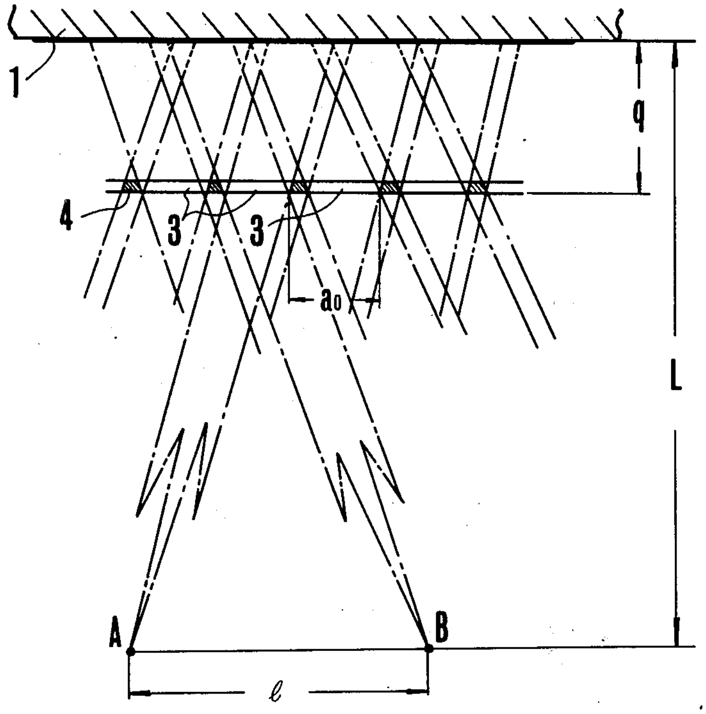
FIG. 2A shows the positional relationship and FIG. 2B is a graph showing the brightness distribution corresponding to FIG. 2A.
Figure 2B:
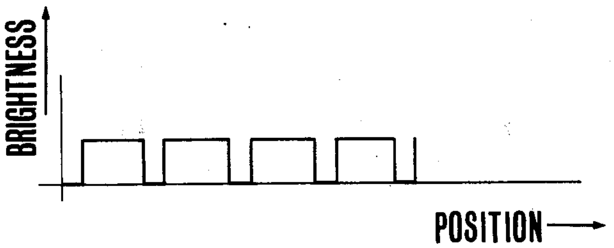
Figure 3:
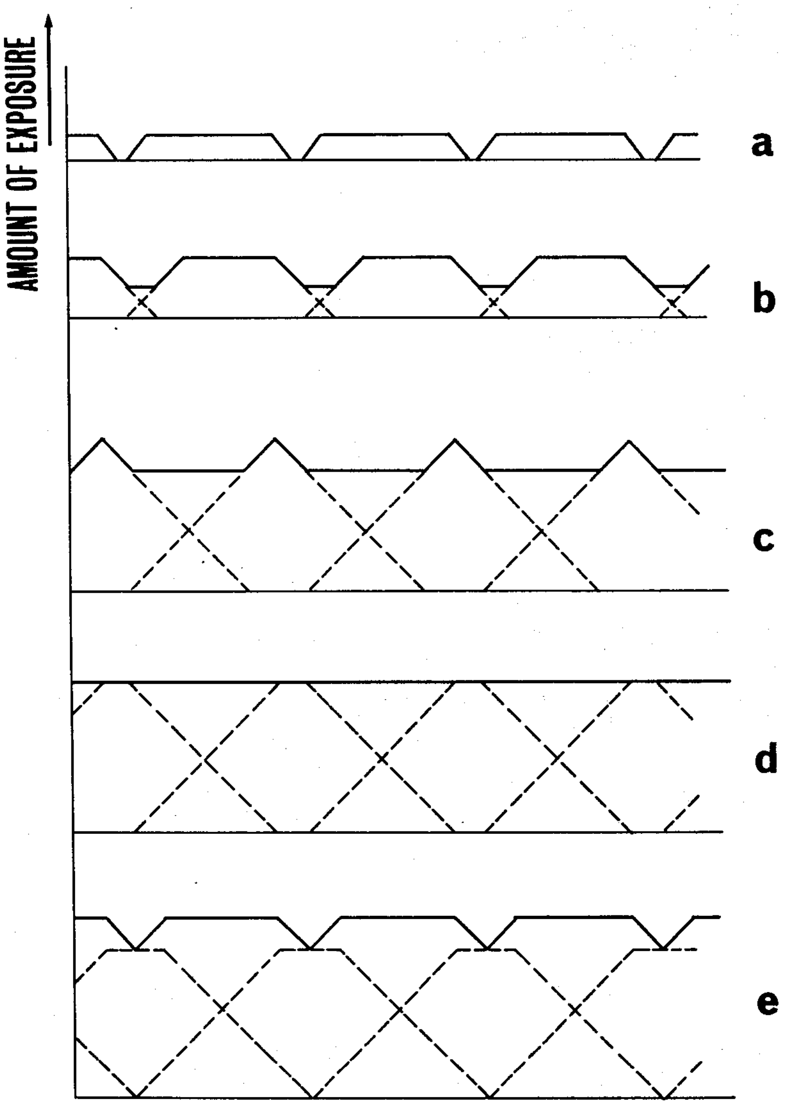
FIG. 3 is a graph showing the variation in the brightness distribution when the exposure source is moved.
Figure 4:
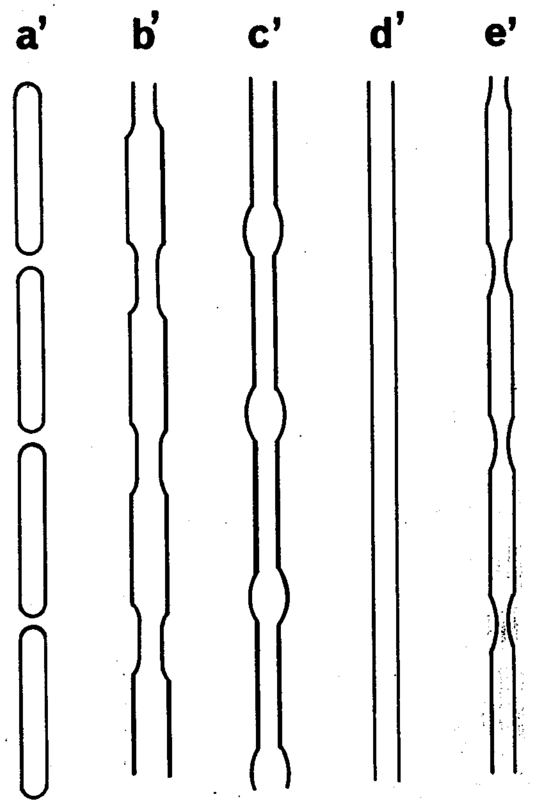
FIG. 4 is a graph corresponding to FIG. 3 showing a manner of forming stripe shaped phosphor films.

The exposure apparatus shown in FIG. 1 operates as follows. With reference now to FIGS. 2A and 2B, when the exposure light source is positioned at a point A in FIG. 2A, the brightness distribution on the exposed surface of the panel 1 is generally shown by the graph shown in FIG. 2B. As the carriage 8 is moved at a constant speed in parallel with the slots, the brightness distribution on the exposed surface varies in accordance with the stroke $l$ of the exposure light source as shown by the graphs *a* through *e* shown in FIG. 3. Since, as the light source moves from point A over a distance $l/2$, the incidence angle of the light upon the exposure surface decreases gradually, so that not only the brightness on the exposure surface increases but also the amount of exposure increases since the light quantity is integrated with time. Consequently, the distribution of the light intercepted by the mask 4 also varies as the exposure light source moves. Between the point at a distance $l/2$ from point $A_1$ and point $B_1$ the incidence angle increases and the brightness on the exposure surface decreases. However, as the light quantity is integrated with time the exposure light quantity increases as a whole. The stripe shaped phosphor films produced by using the exposure light quantity shown in FIG. 3 take the configurations as shown in FIG. 4*a'* through FIG. 4*c'*. In order to form stripe shaped phosphor film *d'* having the most desirable configuration, it is necessary to provide an exposure light distribution as shown in FIG. 4*d'* which can be provided by determining the stroke $l$ of the exposure light source in accordance with the following equation.

$$l = na_0\, L/q$$

where $n$ is equal to an integer larger than 1, $a_0$ represents the pitch of the slots in the longitudinal direction, L represents the distance between the exposure light source and the exposed surface of the panel and $q$ represents the distance between the mask and the exposed surface of the panel.

Actually, however, the valves of $a_0$, $q$ and L are different at the central portion and the peripheral portion of the panel so that in order to eliminate the colour shading at the peripheral portion, it is necessary to determine the $l$ calculated in accordance with the above described equation to satisfy a relation $l_0 < l < l_1$ where $l_0$ and $l_1$ represent the values of the strokes at the central portion and the peripheral portion of the panel, respectively, which are calculated in accordance with the equation described above.

Figure 5:
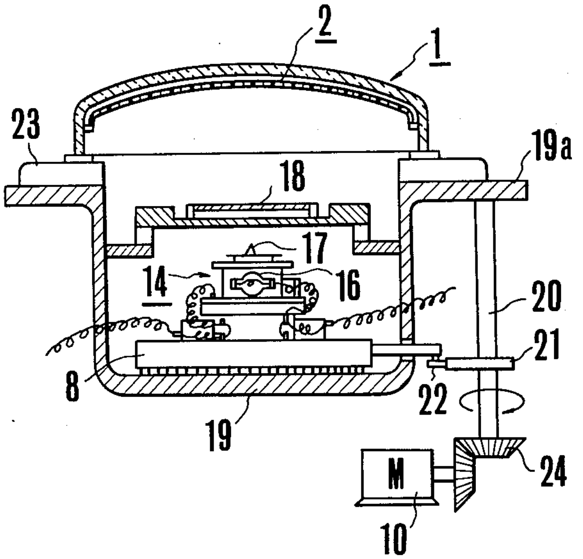
FIG. 5 is a longitudinal sectional view of one example of the exposure apparatus embodying the invention.

FIG. 5 illustrates one embodiment of the exposure apparatus constructed in accordance with this invention which comprises a cylindrical casing 19 having a flange 19*a* at its upper opening for securing a base 23 by means of screws, not shown. The panel 1 of the colour picture tube provided with the slot type colour selection electrode 2 is mounted on the base 23. Within casing 19 are disposed the correction lens 18, light source unit 14 and carriage 8 in the order mentioned. The light source unit 14 provided with a light source 16 in the form of an mercury arc lamp, for example, and the collimeter 17 is mounted on the upper surface of the carriage 8. A link 22 is connected to one end surface of the carriage 8 and extends through an opening at the lower side wall of the casing 19 and the outer end of the link 22 engages the peripheral surface of a heart shaped cam 21 mounted on a rotary shaft 20. The upper end of shaft 20 is journalled by the flange 19*a* and the lower end is connected to the constant speed driving motor 10 via bevel gears 24.

The height of the base 23 is adjusted so as to mount the panel 1 while maintaining the distance L between the exposure light source and the exposed surface of the panel at a prescribed value. When the driving motor 10 is energized, the carriage 8 is reciprocated through shaft 20, cam 21 and link 22. At the same time, the mercury arc lamp 16 is lighted from a suitable source, not shown, for emitting a substantially point light beam from collimeter 17. As this point light beam is reciprocated while maintaining a predetermined relationship among the longitudinal pitch of the slots of the mask, the distance to the exposed surface of the panel, and the distance between the mask and the exposed surface of the panel, continuous stripe shaped phosphor films can be formed.

Figure 6:
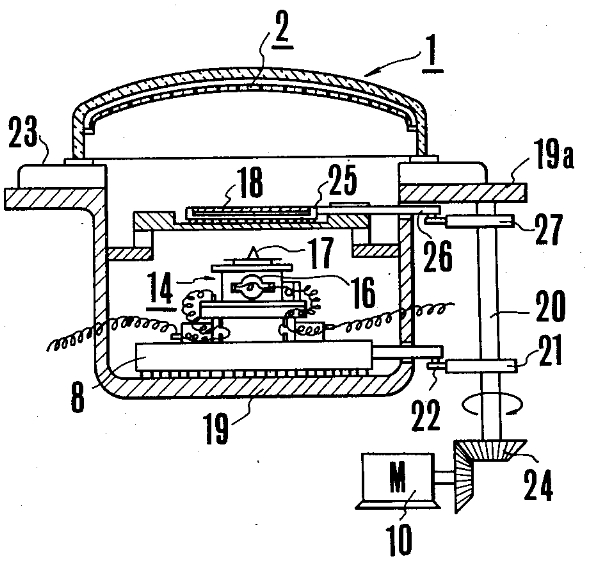
FIG. 6 is a longitudinal sectional view of a modified embodiment of this invention.

In the modified embodiment shown in FIG. 6, instead of being fixedly supported in the casing as shown in FIG. 5 the correction lens 18 is supported by a reciprocating plate 25 which is operated by a heart shaped cam 27 through a link 26. Cam 27 is mounted on shaft 20 driven by motor 10. By shaping both cams 21 and 27 to have the same contour it is possible to reciprocate the correction lens 18 in synchronism with the carriage 8 thereby eliminating the difficulty which occurs when the correction lens is held stationary, that is, the erroneous correction caused by the variation in the direction of refraction of the light due to the movement of the exposure light source.

Figure 7:
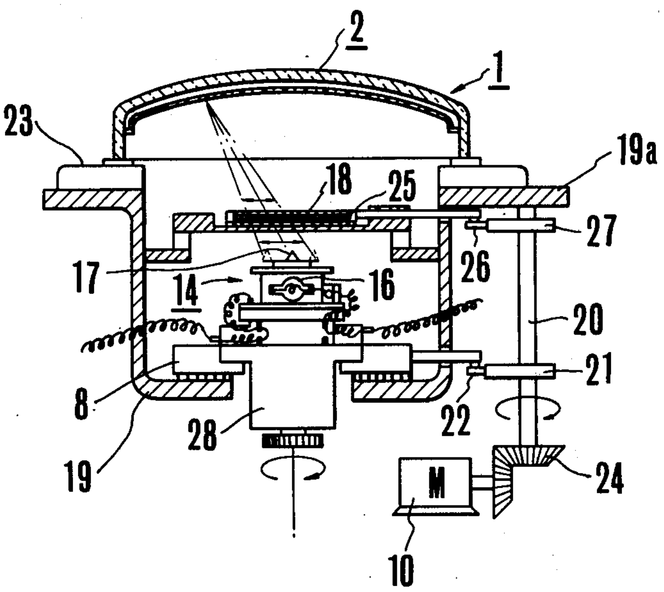
FIG. 7 is a longitudinal sectional view of still another modification of this invention and FIG. 8 is a diagrammatic perspective view of a light source unit utilized in the exposure apparatus of this invention.

FIG. 7 shows another modification of this invention provided with a rotary disc 28. The lower end of the rotary disc 28 extends through the bottom of the casing 19 and connected to a driving motor, not shown. Thus, the light source unit 14 is mounted on carriage 8 through the rotary disc 28 rotating about the axis of the collimeter 17. With this construction, as the light source unit 14 is rotated while being reciprocated it is possible to make uniform the brightness distribution of the exposure light source in the radial direction thereof which is an essential condition for forming the films of the non-luminous substance. This rotary light source is advantageous where it is difficult to obtain an ideal point light source, thus simplifying the manufacturing of the filters utilized to expose the blue, red and green phosphor films.

Figure 8:
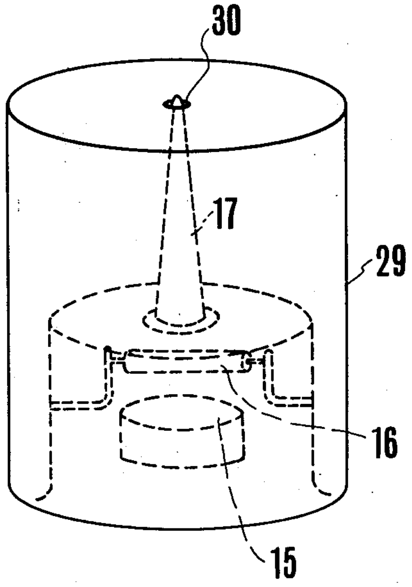

FIG. 8 shows the detail of the light source unit 14 comprising a light shielding cylinder 29 provided with a small opening 30 at the center of the top wall. Inside the cylinder 29 are contained collimeter 17 with its apex positioned to oppose the opening 30, the mercury arc lamp 16 and reflecting mirror 15 which are disposed in the order mentioned. With this arrangement it is possible to provide a light source that can be deemed as a point light source although a linear mercury arc lamp is used.

As can be noted from the foregoing description, the invention provides an effective exposure treatment of the fluorescent screen in which uniform distribution of the exposure light will not be disturbed by the image of the collimeter which was unavoidable with the prior art exposure apparatus.

What is claimed is:

1. In the manufacture of the phosphor screen of a color television picture tube, said tube having a face plate panel with an inner surface on which said screen is to be formed as a series of stripes extending in parallel across one dimension of said panel and a slot type color selection electrode mounted in operative position relative to said panel, exposure apparatus comprising:

a support for mounting the panel and color selection electrode on the apparatus;

a carriage within said apparatus and spaced from said support, said carriage being mounted for translational movement in a direction generally parallel to the direction of the longitudinal dimension of the slots in the electrode when the electrode is mounted on said support;

a point light source mounted on said carriage and movable therewith in an exposure plane for irradiating the inner surface of the panel with light projected through the slots in the electrode when the panel is mounted on said support;

a correction lens interposed between said point light source and said support, and means operatively connected to said carriage for driving said carriage in said generally parallel direction and to move said point source in said exposure plane at a substantially constant speed.

2. The exposure apparatus according to claim 1 which further comprises means operatively connected to the correction lens for translating said correction lens relative to said support in a direction generally parallel to the direction of the longitudinal dimension of the slots in the electrode when the electrode is mounted on said support.

3. The exposure apparatus according to claim 1 wherein said support comprises a casing provided with a flange adapted to support said panel, said carriage is disposed on the bottom of said casing, and said driving means comprises a constant speed motor, a cam driven by said motor and a link mechanism operated by said cam for reciprocating said carriage in said generally parallel direction.

4. The exposure apparatus according to claim 1 wherein said correction lens is mounted for translational movement in a direction parallel to the direction of the longitudinal dimension of the slots in the electrode when the electrode is mounted on said support, and said carriage and said correction lens are coupled to said means for driving to be reciprocated in synchronism in the same direction.

5. The exposure apparatus according to claim 1 wherein said exposure light source comprises a linear light source, a reflecting mirror disposed below said linear light source, a collimeter mounted above said linear light source and a cylindrical light shield having an opening positioned to oppose the apex of said collimeter, said apex movable in said exposure plane in said generally parallel direction.

6. The exposure apparatus according to claim 1 which further comprises a rotary disc rotatably supported on said carriage and said light source is mounted on said rotary disc and means operatively connected to said disc adapted for rotatably driving said disc while said carriage is moved in said generally parallel direction.

7. The exposure apparatus according to claim 1 wherein said carriage is reciprocated over a stroke $l$ defined with respect to the panel when mounted on said support to satisfy a relation $$l_0 < l < l_1$$

wherein $l_0$ and $l_1$ represent the strokes of said carriage respectively at the central portion and the peripheral portion of the panel and are calculated for the respective portions from the relation $l = n\, a_0\, L/q$ where $n$ is an integer larger than one, $a_0$ is the pitch of the slots in said direction, L is the distance between the exposure light source and the exposed surface of the panel and $q$ is the distance between the mask and the exposed surface.

* * * * *